United States Patent
Lee et al.

(10) Patent No.: US 10,338,763 B2
(45) Date of Patent: Jul. 2, 2019

(54) MOBILE TERMINAL AND CONTROL METHOD THEREOF FOR DISPLAYING HOME SCREEN BACKGROUND IMAGES AND VIDEO

(71) Applicant: LG ELECTRONICS INC., Seoul (KR)

(72) Inventors: Minjeong Lee, Seoul (KR); Sangwoon Lee, Seoul (KR); Choonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 14/029,406

(22) Filed: Sep. 17, 2013

(65) Prior Publication Data
US 2014/0123013 A1    May 1, 2014

(30) Foreign Application Priority Data
Oct. 31, 2012 (KR) .......... 10-2012-0122512

(51) Int. Cl.
*H04M 1/725* (2006.01)
*G06F 3/0481* (2013.01)
(Continued)

(52) U.S. Cl.
CPC .......... *G06F 3/0481* (2013.01); *G06F 3/0485* (2013.01); *G06F 3/0488* (2013.01);
(Continued)

(58) Field of Classification Search
CPC ................................. H04M 1/72544
See application file for complete search history.

(56) References Cited

U.S. PATENT DOCUMENTS 6,784,879 B1 * 8/2004 Orr ..................... H04N 5/44513
                                                       345/204
9,003,335 B2 * 4/2015 Lee ..................... G06F 3/04883
                                                       345/176
(Continued)

FOREIGN PATENT DOCUMENTS

CN        101080065 A     11/2007
CN        102012783 A      4/2011
(Continued)

OTHER PUBLICATIONS

"TechHive: iPhone Video apps", Tim Moynihan, Sep. 14, 2012, TechHive.*

(Continued)

*Primary Examiner* — Kieu D Vu
*Assistant Examiner* — Roberto Borja
(74) *Attorney, Agent, or Firm* — Birch, Stewart, Kolasch & Birch, LLP

(57) ABSTRACT

A mobile terminal allowing for a touch input and a control method thereof are provided. The mobile terminal includes a display unit configured to output a first home screen page among at least one home screen page, and a controller configured to output a first image corresponding to video data, as a background image of the first home screen page, wherein in response to a sensed touch input for switching the first home screen page to a second home screen page different from the first home screen page, the controller controls the display unit to play an image corresponding to the video data while the first home screen page is being switched to the second home screen page.

14 Claims, 17 Drawing Sheets

(51) Int. Cl.
*G06F 3/0485* (2013.01)
*G06F 3/0488* (2013.01)

(52) U.S. Cl.
CPC ............... *H04M 1/72544* (2013.01); *G06F 2203/04808* (2013.01); *G09G 2340/0435* (2013.01)

(56) References Cited

U.S. PATENT DOCUMENTS

| | | | |
|---|---|---|---|
| 2007/0118801 A1* | 5/2007 | Harshbarger et al. | ........................ G11B 27/031 715/730 |
| 2008/0153551 A1 | 6/2008 | Baek et al. | |
| 2008/0184297 A1* | 7/2008 | Ellis | ...... G11B 27/005 725/39 |
| 2009/0002335 A1* | 1/2009 | Chaudhri | ...................... 345/173 |
| 2009/0144623 A1* | 6/2009 | Jung | ...................... G06F 3/0488 715/716 |
| 2009/0195515 A1* | 8/2009 | Lee | ...................... G06F 3/04817 345/173 |
| 2010/0283743 A1* | 11/2010 | Coddington | ...................... 345/173 |
| 2011/0119610 A1* | 5/2011 | Hackborn | ............. G06F 3/0481 715/768 |
| 2011/0163969 A1 | 7/2011 | Anzures et al. | |
| 2011/0167380 A1 | 7/2011 | Stallings et al. | |
| 2012/0313946 A1* | 12/2012 | Nakamura | .......... G06F 3/04815 345/426 |
| 2013/0058019 A1* | 3/2013 | Lee | ...................... G06F 3/04883 361/679.01 |
| 2013/0069962 A1* | 3/2013 | Nealer et al. | .................. 345/522 |
| 2013/0198634 A1* | 8/2013 | Matas et al. | .................. 715/717 |
| 2013/0307792 A1* | 11/2013 | Andres | ................ G11B 27/005 345/173 |
| 2013/0346865 A1* | 12/2013 | Yuan | ...................... G06F 3/0484 715/720 |
| 2014/0362118 A1* | 12/2014 | Brydon et al. | ................ 345/660 |
| 2015/0128092 A1* | 5/2015 | Lee | ................... H04M 1/72544 715/841 |
| 2015/0286368 A1* | 10/2015 | Park | .................... G06F 3/04883 345/581 |

FOREIGN PATENT DOCUMENTS

| | | |
|---|---|---|
| CN | 102243581 A | 11/2011 |
| CN | 102413229 A | 4/2012 |
| CN | 102754062 A | 10/2012 |
| KR | 10-2012-0029722 A | 3/2012 |
| KR | 10-2012-0104242 A | 9/2012 |

OTHER PUBLICATIONS

"MultiPicture", Michael Ian, Apr. 23, 2012, Androidica.*
Ahmazinskm,"Better Instructions for Multipicture Live Wallpaper," YouTube, https://www.youtube.com/watch?v=Bf0hZG4u-6E, Jan. 21, 2012, 6 pages total, XP054977684.
Stormy Beach, "Multipicture Live Wallpaper," YouTube, https://www.youtube.com/watch?v=XJVilfwPaal, Nov. 16, 2010, 3 pages total, XP054977685.

* cited by examiner

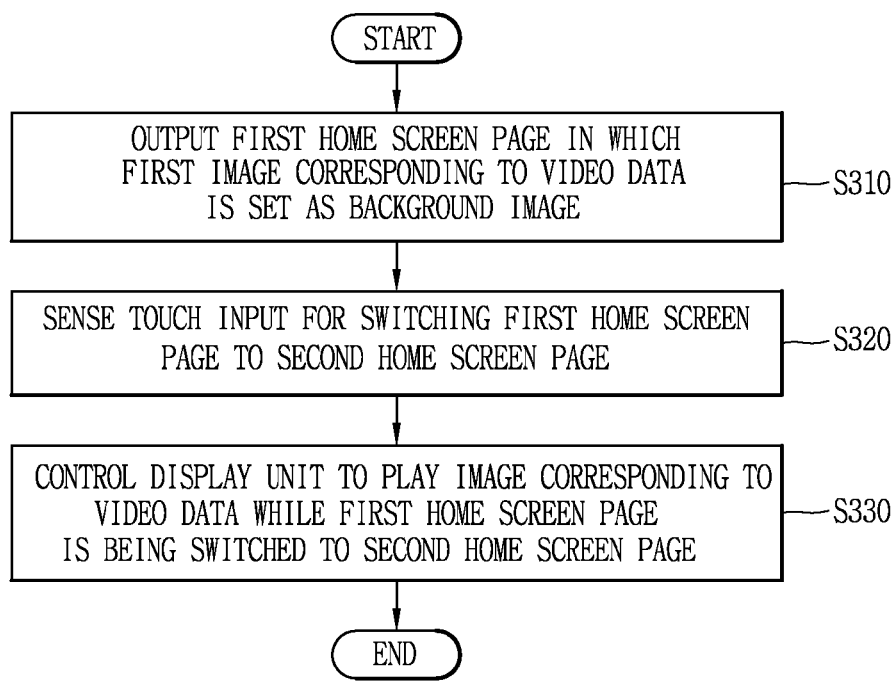

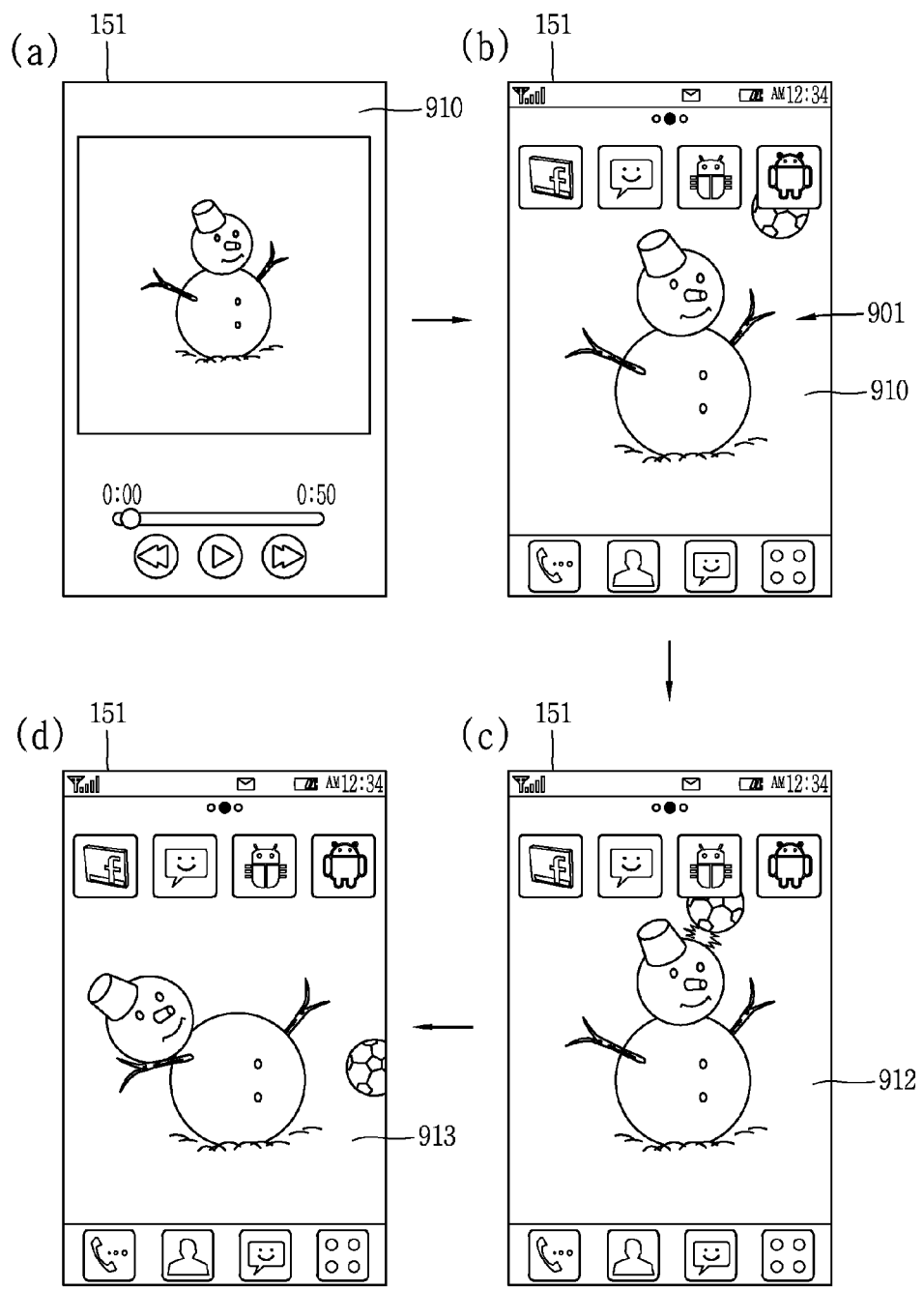

MOBILE TERMINAL AND CONTROL METHOD THEREOF FOR DISPLAYING HOME SCREEN BACKGROUND IMAGES AND VIDEO

CROSS REFERENCE TO RELATED APPLICATIONS

Pursuant to 35 U.S.C. § 119(a), this application claims the benefit of earlier filing date and right of priority to Korean Application No. 10-2012-0122512, filed on Oct. 31, 2012, the contents of which is incorporated by reference herein in its entirety.

BACKGROUND OF THE INVENTION

Field of the Invention

The present invention relates to a mobile terminal available for a touch input and a control method thereof.

Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Also, a home screen page including an icon or a widget related to an application may be output to a touch screen of a mobile terminal. In general, a plurality of home screen pages may be provided, and only any one of the plurality of home screen pages is output to a display unit. Meanwhile, a user may apply a touch to the display unit by habit to change a home screen page output to the display unit into a different home screen page.

SUMMARY OF THE INVENTION

An aspect of the present invention is to provide a mobile terminal capable of providing visual fun to a user in response to a touch input applied to a display unit, and a control method thereof.

According to an embodiment of the present invention, there is provided a mobile terminal including a display unit configured to output a first home screen page among at least one home screen page; and a controller configured to output a first image corresponding to video data, as a background image of the first home screen page, wherein in response to a sensed touch input for switching the first home screen page to a second home screen page different from the first home screen page, the controller controls the display unit to play an image corresponding to the video data while the first home screen page is being switched to the second home screen page.

In an embodiment of the present invention, the video data may include a plurality of images including information regarding different points in time, and the image played on the display unit may be related to at least one image continued from the first image among the plurality of images.

In an embodiment of the present invention, when the switching from the first home screen page to the second home screen page is completed, the controller stops playing of the image and outputs a second image, which was being output to the display unit at a point in time at which the playing of the image is stopped, as a background image of the second home screen page.

In an embodiment of the present invention, at least one function icon corresponding to different functions may be displayed in the home screen page, and when a touch input corresponding to a pre-set scheme is applied to the display unit, the controller may not output the function icon any longer and activate a clean view mode for playing an image corresponding to the video data on the display unit.

In an embodiment of the present invention, the touch input corresponding to the pre-set scheme may be a pinch-in touch input, and when a pinch-out touch input, the opposite to the pinch-in touch input, is applied to the display unit, the controller may terminate the clean view mode and output again the function icon on the home screen page.

In an embodiment of the present invention, when the clean view mode is terminated, a third image, which was being displayed on the display unit at a point in time at which the pinch-out touch input was applied, may be output as a background image of the home screen page.

In an embodiment of the present invention, the controller may output images corresponding to different video data according to a degree in which the pinch-in touch input is applied.

In an embodiment of the present invention, when the home screen page is output to the display unit, state information is output to a region of the display unit, and in a state in which the clean view mode is activated, only an image corresponding to the video data is played without outputting the state information.

In an embodiment of the present invention, when a touch input is applied to the display unit while the image is being played, the controller may output at least one graphic image related to control and change of the video data.

In an embodiment of the present invention, the first home screen page is switched to the second home screen page according to a flicking or dragging touch input applied to the display unit, and a play rate of the image being played while the first home screen page is switched to the second home screen page may vary according to a touch rate of the flicking or dragging touch input.

In an embodiment of the present invention, play sections of images played while the first home screen is being switched to the second home screen page according to the flicking or dragging touch input are different.

In an embodiment of the present invention, when an output request with respect to a home screen page is received from a user while an image corresponding to video data different from the video data on the display unit, the controller may play the image corresponding to the different video data in a background of the home screen page together with the home screen page or may output any one image included in the different video data.

In an embodiment of the present invention, while the first home screen page is being switched to the second home screen page, the amount of images included in the video data played on the display unit may vary according to a user setting.

In an embodiment of the present invention, when a touch input is applied to the display unit in a first direction, the controller may switch the first home screen page output to the display unit to the second home screen page, and when a touch input is applied to the display unit in a second direction, the controller may change the video data to video data different from the video data, and change a background image of the first home screen page to an image corresponding to the different video data.

In an embodiment of the present invention, the video data is video data edited to have a capacity level equal to or smaller than pre-set capacity in the video data equal to or greater than the pre-set capacity, and the video data may be stored in a memory, together with the different video data edited to have a capacity level equal to or smaller than the pre-set capacity.

According to another embodiment of the present invention, there is provided a control method of a mobile terminal, including outputting a home screen page in which a first image corresponding to video data as a background image; sensing a touch input corresponding to a pre-set scheme with respect to the home screen page; and terminating outputting of the home screen page on the basis of the touch input, and playing video corresponding to the video data, starting from a point corresponding to the first image, wherein in the playing of the video, a function icon included in the home screen page is not output.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 3 is a flow chart illustrating a control method of a mobile terminal according to an embodiment of the present invention.

FIGS. 9A and 9B are conceptual views illustrating a method for outputting a video being used in a mobile terminal according to an embodiment of the present invention to a home screen page.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
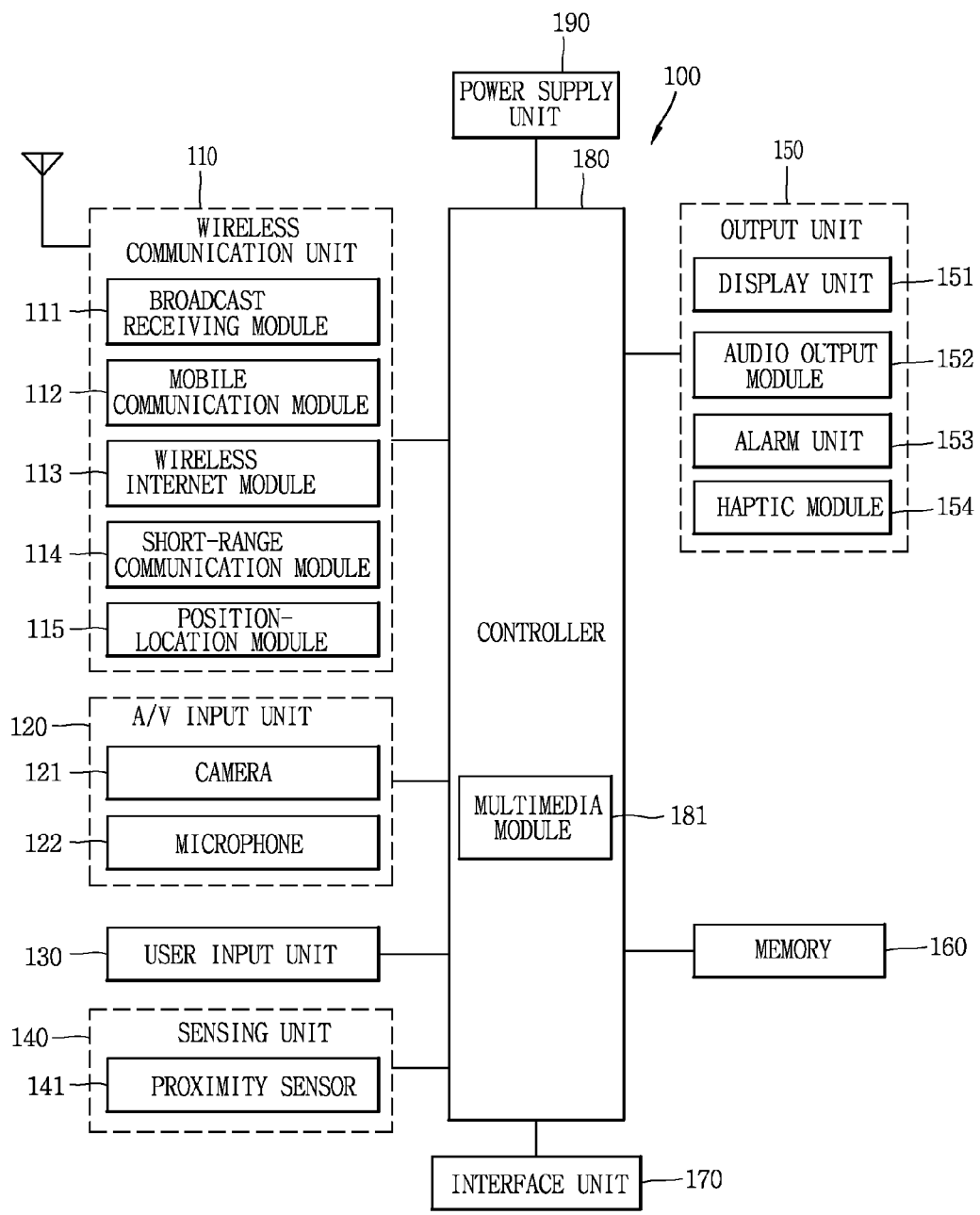
FIG. 1 is a block diagram of a mobile terminal according to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user with respect to applications. Also, in a locked state, the controller may control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal according to an embodiment of the present invention described above with reference to FIG. 1, the mobile terminal in which components of the mobile terminal are disposed, or the structure of the mobile terminal will be described.

Figure 2A:
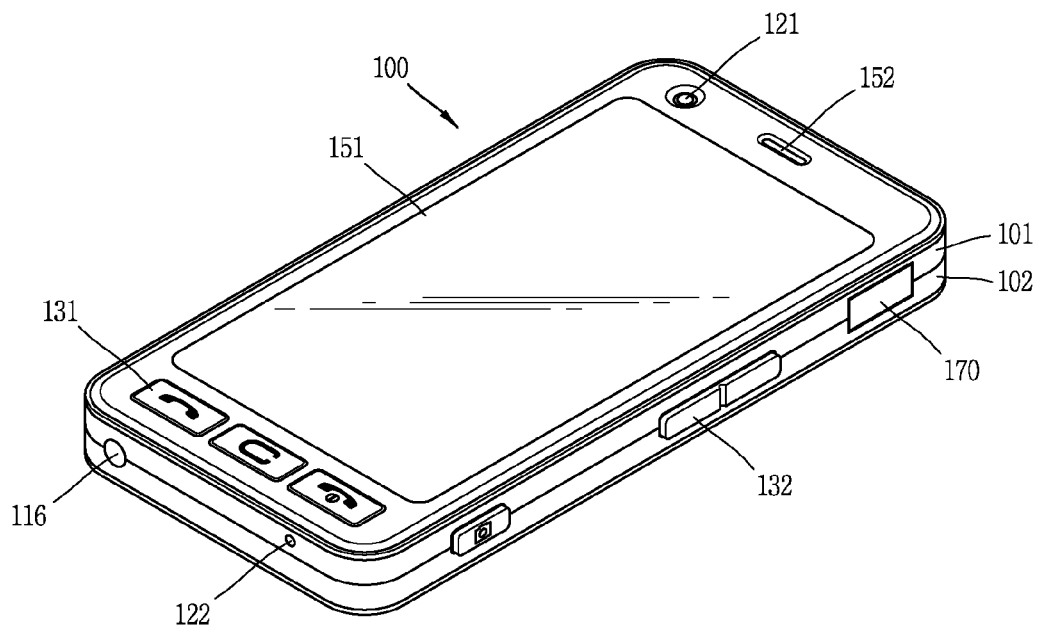
FIGS. 2A and 2B are front perspective views illustrating an example of a mobile terminal according to an embodiment of the present invention.
Figure 2B:
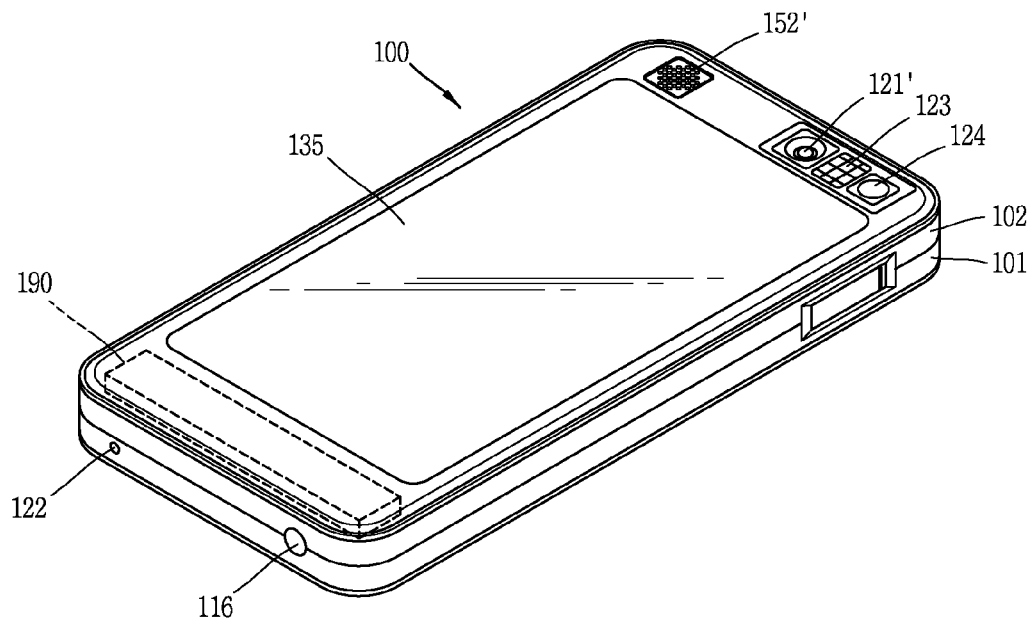

FIG. 2A is a front perspective view of the mobile terminal according to an embodiment of the present invention, and FIG. 2B is a rear perspective view of the mobile terminal illustrated in FIG. 2A.

The disclosed mobile terminal has a bar type terminal body. However, the present invention is not limited thereto and may be applicable to various structures such as a slide type mobile terminal, a folder type mobile terminal, a swing type mobile terminal, a swivel type mobile terminal, etc, in which two or more bodies are combined to be relatively movable.

As illustrated, the terminal body 100 (referred to as 'body', hereinafter) includes a front surface, a lateral surface, and a rear surface. Also, the body includes both ends formed in a length direction.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130/131, 132, the microphone 122, the interface unit 170, etc. may be disposed mainly on the front case 101 of the terminal body 100.

The display unit 151 occupies the most of a main surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102. The microphone 122 may be disposed on the other end of the body 100.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 132 may receive a command such as controlling of the size of a sound outputted from the audio output unit 152 or conversion into a touch recognition mode of the display unit 151.

With reference to FIG. 2B, an audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

A camera 121' may additionally be disposed on the rear case 102 of the terminal body. The camera 121' may have an image capture direction which is substantially opposite to that of the camera 121 (See FIG. 2*a*), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output unit 252' may be additionally disposed on the rear surface of the terminal body. The audio output unit 252' may implement a stereoscopic function along with the audio output module 22 (See FIG. 2A), and may be used for implementing a speaker phone mode during call communication.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such a touch pad 135 may be configured to be light-transmissive like the display unit 151. In this case, when the display unit 151 is configured to output visual information from both surfaces thereof, the visual information may be recognized also through the touch pad 135. The information output to the both surfaces of the display unit 151 may be controlled by the touch pad 135. Also, a display unit may be additionally mounted on the touch pad 135, so a touch screen may be displayed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

Also, the mobile terminal according to an embodiment of the present invention that may include one or more of the components as described above may play (or reproduce) a video on a display unit in response to a touch input for moving any one of home screen pages output to the display unit to a different home screen page. Thus, a user may be provided with a video in response to an habitual touch input applied to the display unit, as well as a touch input for moving a home screen page, obtaining visual fun.

Figure 4:
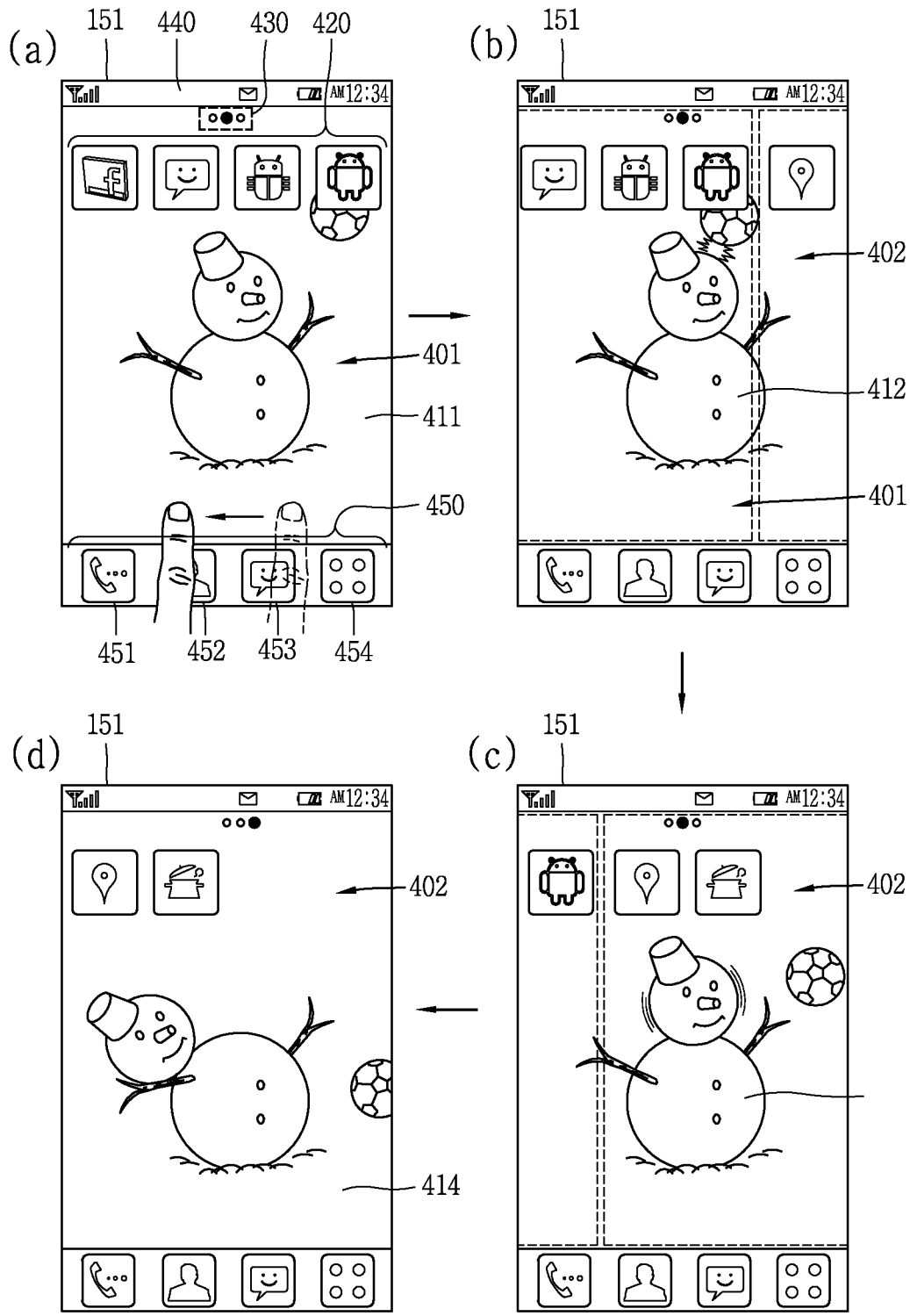
FIG. 4 is a conceptual view illustrating the control method of FIG. 3.

Hereinafter, a method for playing a video on a home screen page will be described in detail together with the accompanying drawings. FIG. 3 is a flow chart illustrating a control method of a mobile terminal according to an embodiment of the present invention, and FIG. 4 is a conceptual view illustrating the control method of FIG. 3.

In the mobile terminal according to an embodiment of the present invention, the controller 180 (please see FIG. 1) outputs a first home screen page in which a first image corresponding to video data is set as a background image in the mobile terminal (S310).

Here, the home screen page may be expressed as an idle screen. When the mobile terminal is in an idle state, the home screen page is output to the display unit 151. Here, the idle state of the mobile terminal may include even a state in which an executed application screen is not output to the display unit 151 although an application is being executed, while the home screen page is output to the display unit 151.

The home screen page will be described in detail. As illustrated in FIG. 4, at least one object 420 may be included in the home screen page 401, and the object 420 may be an icon or a widget of an application installed in the mobile terminal.

Meanwhile, as illustrated in (a) and (b) of FIG. 4, the home screen page 400 may be configured as a plurality of home screen pages according to a user selection or according to the amount of applications installed in the terminal, and any one of the plurality of home screen pages may be output to the display unit 151 according to a user selection.

Meanwhile, when the home screen page 401 is output to the display unit 151, as illustrated in FIG. 4(*a*), the home screen page 401 may include at least one of an identification information region 430 in which identification information regarding the home screen page 401 output to the display unit 151 is displayed, a state information region 440 in which information regarding a state of the mobile terminal is displayed, and a pre-set region 450 in which icons 451, 452, 453, and 454 of basically set applications are displayed.

Identification information indicating which one of the plurality of home screen pages a currently output home screen page 401 corresponds to may be output to the identification information region 430.

Also, at least one of information regarding an antenna of the terminal, information regarding a communication mode, information regarding a battery of the terminal, information regarding a generated event, information regarding a pre-set function, and time information may be output to the state information region 440.

Also, icons corresponding to particular applications according to a user selection or previously set by the controller may be fixedly displayed in the pre-set region 450.

Meanwhile, when any one home screen page 401 is output to the display unit 151, the controller 180 may continuously output at least one of the identification information region 430, the state information region 440, and the pre-set region 450 to a pre-set position of the display unit 151.

Meanwhile, in a state in which any one home screen page 401 is output to the display unit 151, the controller 180 may output an image corresponding to video data as a background image of the home screen page 401.

Here, the video data includes a plurality of images including information different points in time. Namely, the mobile terminal may sequentially output a plurality of images included in the video data on the basis of the information regarding different points in time.

In this manner, the controller 180 may output any one of the plurality of images included in the video data as a background image 411 of the home screen page 401.

Meanwhile, the video data played (or reproduced) on the home screen page may be video data on the basis of a user selection. The video data played on the home screen page may be video data having a capacity level equal to or smaller than pre-set capacity. In this manner, the video data having a capacity level equal to or smaller than the pre-set capacity may be video data edited to have a capacity level equal to or smaller than the pre-set capacity in the video data having a capacity level equal to or greater than the pre-set capacity. Meanwhile, a play section of the video data edited to have a capacity level equal to or smaller than the pre-set capacity may be determined according to a user selection. Also, the controller 180 may store the video data edited to have a capacity level equal to or smaller than the pre-set capacity in the memory 160 (please see FIG. 1).

Namely, the user may select video data to be output in the home screen page from among video data having a capacity level sufficient to be output in the home screen page.

Meanwhile, video data may be files having file name extensions such as avi, wmv, mpg, divx, mp3, mov, flv, mp4, way, and the like, and files having various file name extensions that can be played (or reproduced) in the mobile terminal. Video data may be previously stored in the memory unit 160 or may be downloaded through the wireless communication unit 110.

In a state in which any one home screen page 401 is output, the sensing unit 140 (please see FIG. 1) senses a touch input for switching from the any one home screen page 401 to a home screen page 402 different from the any one home screen page (S320). Here, the touch input includes a proximity touch.

Here, for the descriptive purpose, the any one home screen page 401 will be referred to as a 'first home screen page', and the other home screen page 402 will be referred to as a 'second home screen page'.

When a touch input for switching from the first home screen page 401 to the second home screen page 402 is sensed, the controller 180 may move the second home screen page 402 in a pre-set direction on the display unit 151 until when the first home screen page 401 is not output to the display unit 151 any longer, in order to output the second home screen page 402 to the display unit 151.

While the first home screen page 401 is being switched over to the second home screen page 402, the controller 180 may control the display unit 151 such that images corresponding to the video data are played (S330). Here, the video data is video data including an image output as a background image 401 of the first home screen page 401.

For example, as illustrated in FIG. 4(a), in a state in which the first home screen page 401 is output, when a slide, drag, or flick touch input applied to the display unit 151 is sensed, as illustrated in (b), (c), and (d) of FIG. 4, the first home screen page is moved according to at least one pre-set method and the second home screen page 402 is gradually output to the display unit 151. At this time, images corresponding to the video data are played on the display unit 151. Here, the images (or video) are played, starting from an image continued from time information of an image corresponding to a background image of the first home screen page 402 among a plurality of images included in the video data.

Meanwhile, while the first home screen page 401 is being switched to the second home screen page 402, the amount of images being played on the display unit 151 or a play rate (or play speed) of the mages may be variously changed. While the first home screen page 401 is being switched to the second home screen page 402, the amount of images played on the display unit 151 or a play rate of the images may be changed according to a user selection.

Meanwhile, while images are being played according to switchover from the first home screen page 401 to the second home screen page 402 as illustrated in (b) and (c) of FIG. 4, when the switchover from the first home screen page 401 to the second home screen page 402 is completed as illustrated in FIG. 4(c), the controller 180 stops playing of the images. Thereafter, the controller 108 outputs an image being output to the display unit 151 at a point in time at which the playing of the images is stopped, as a background image 414 of the second home screen page 402. Namely, when playing of images is stopped, the controller 180 may set any one of the plurality of images included in the video data, as a background image of the second home screen page 402 again. Meanwhile, although not shown, As discussed above, in the case of the mobile terminal and the control method thereof according to embodiments of the present invention, a video is being played on the display unit, while any one home screen page is being switched to a different home screen page on the basis of a touch input applied to the display unit. Thus, since the user is provided with video at the same time when a home screen page is switched, the user may have visual fun in using the terminal.

Hereinafter, a method for controlling images being played on a home screen page will be described with reference to the accompanying drawings. FIGS. 5A through 5D are conceptual views illustrating a method for outputting a video together with a home screen page in a mobile terminal according to an embodiment of the present invention. FIGS. 6A and 6B are conceptual views illustrating a method for controlling a video in a home screen page in a mobile terminal according to an embodiment of the present invention.

As discussed above with reference to FIGS. 3 and 4, in the mobile terminal according to an embodiment of the present invention, in a state in which any one home screen page is output to the display unit 151, when a touch input for outputting any other home screen page is sensed, the any one home screen page may be switched over into the other home screen page while images corresponding to the video data are being played on the display unit 151.

In such a case, the controller 180 may variously control played images according to a touch input applied to the display unit 151 as sensed.

For example, the controller 180 may control images to be played in various directions according to a direction of a touch input for moving a home screen page.

For example, when any one home screen page is switched to any other home screen page according to a drag, slide, or flick touch input applied to the display unit 151, the controller 180 may control images to be played in different directions according to a touch direction of the drag, slide, or flick touch input.

Referring to FIG. 4, as illustrated in (a) of FIG. 4, when a drag, slide, or flick touch input applied from the left to the right is sensed, the controller 180 may play images corresponding to the video data in a forward direction. When a drag, slide, or flick touch input applied from the left to the right is sensed as illustrated in (a) of FIG. 5A, the controller 180 may play images corresponding to the video data in a reverse direction as illustrated in (b) and (c) of FIG. 5A. Here, the forward direction refers to a direction in which images are played during which a play time is gradually increased, and the reverse direction refers to a direction in which images are played during which a play time is gradually decreased.

Figure 5A:
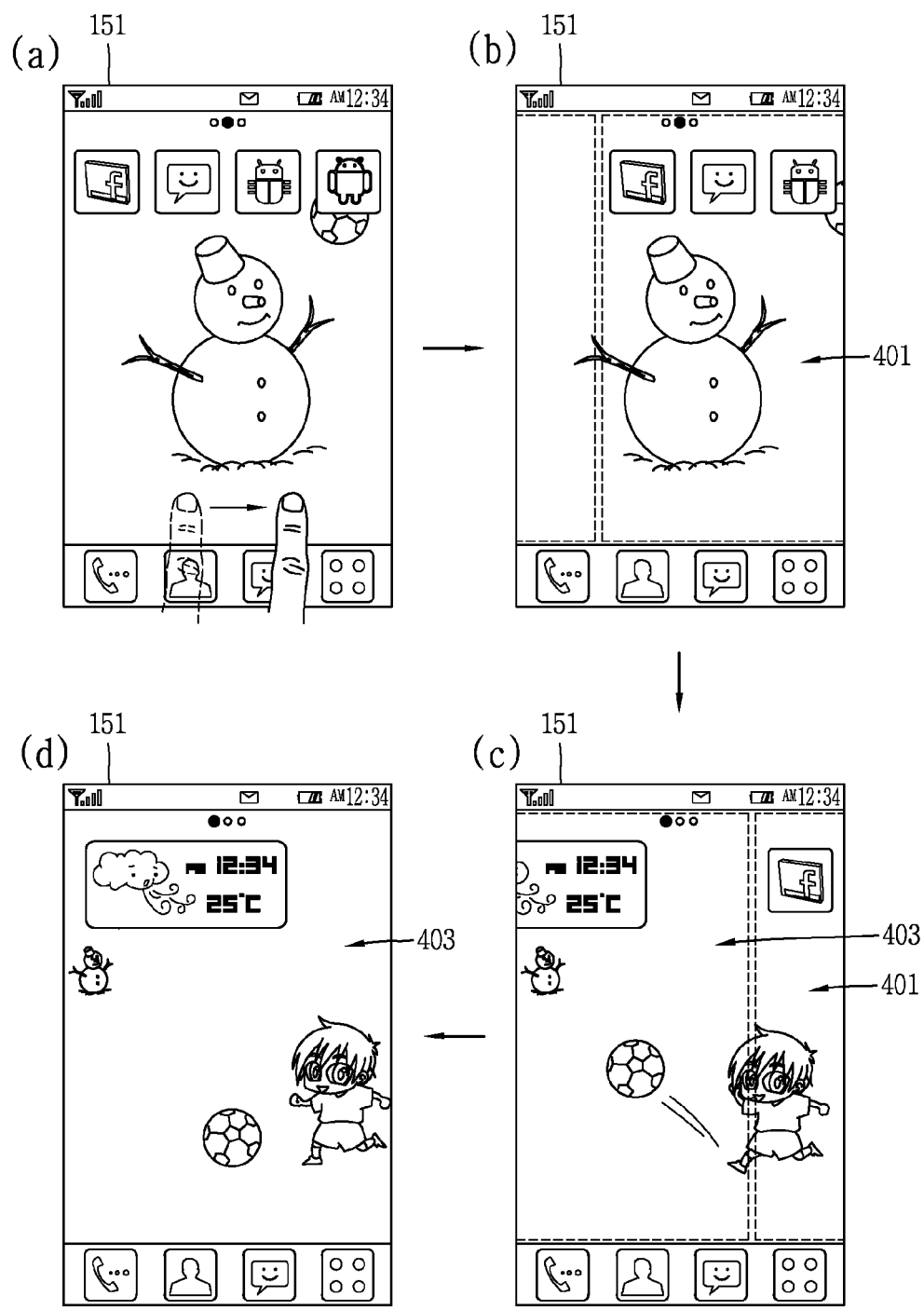
FIGS. 5A through 5D are conceptual views illustrating a method for outputting a video together with a home screen page in a mobile terminal according to an embodiment of the present invention.
Figure 6A:
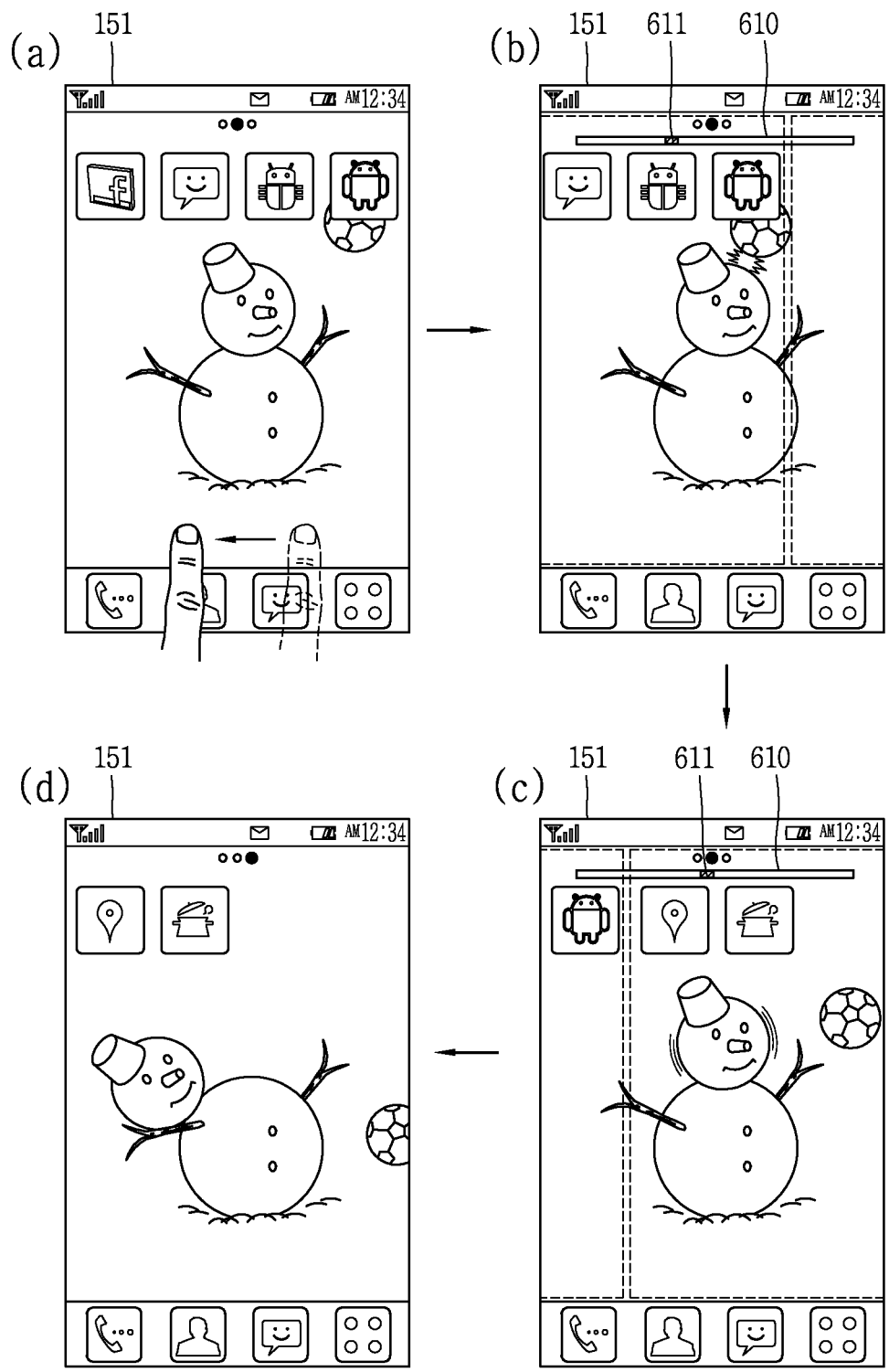
FIGS. 6A and 6B are conceptual views illustrating a method for controlling a video in a home screen page in a mobile terminal according to an embodiment of the present invention.
Figure 6B:
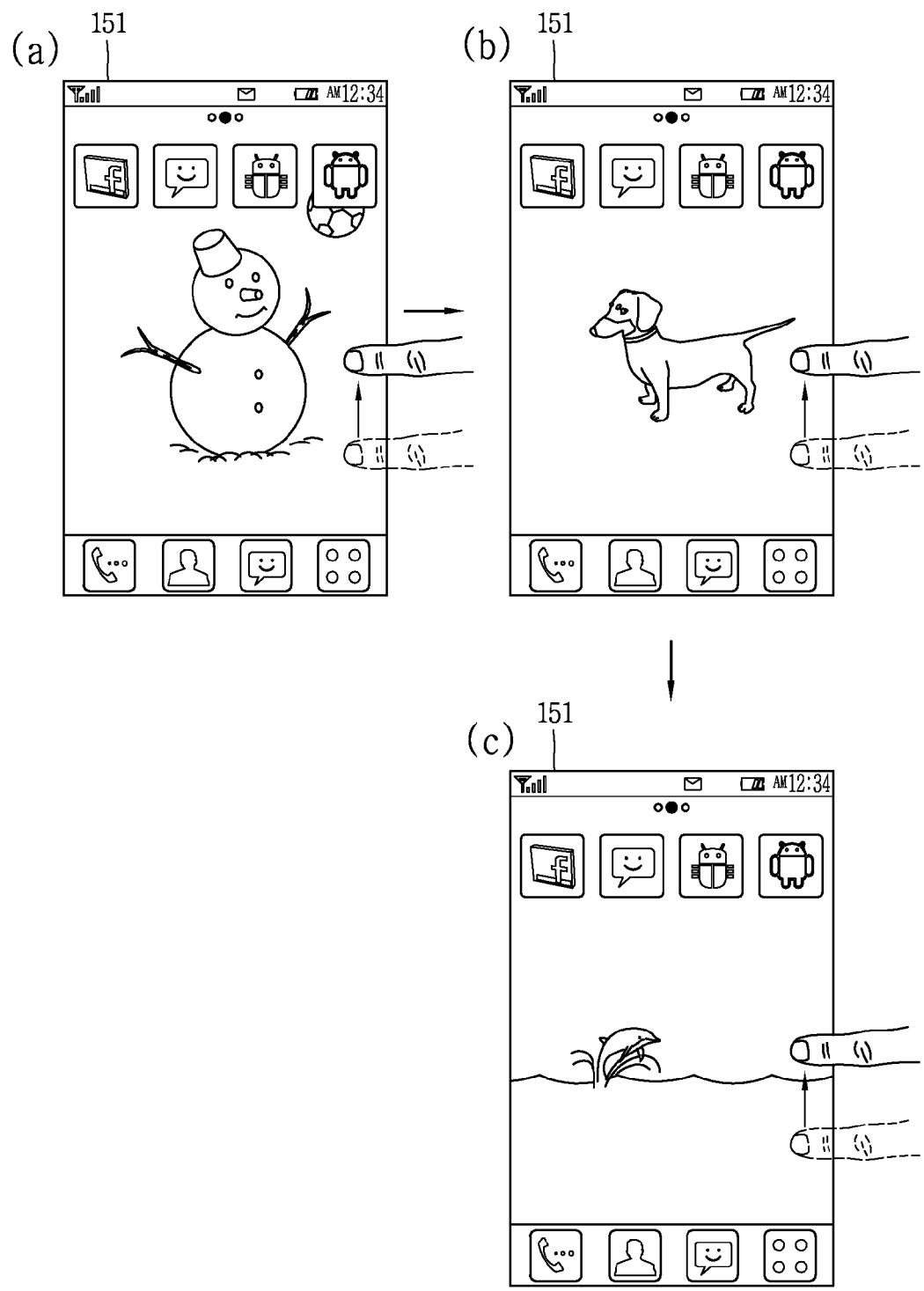

Meanwhile, when a touch input applied to the display unit 151 in a certain direction, the controller 180 may switch from a home screen page currently output to the display unit 151 to a different home screen page as illustrated in (d) of FIG. 4 and (d) of FIG. 5A.

In an example in which an image played in a home screen page is variously controlled according to a touch input applied to the display unit 151 as sensed, the controller 180 may control a play rate of images differently according to a degree of a touch input applied to the display unit 151.

Figure 5B:
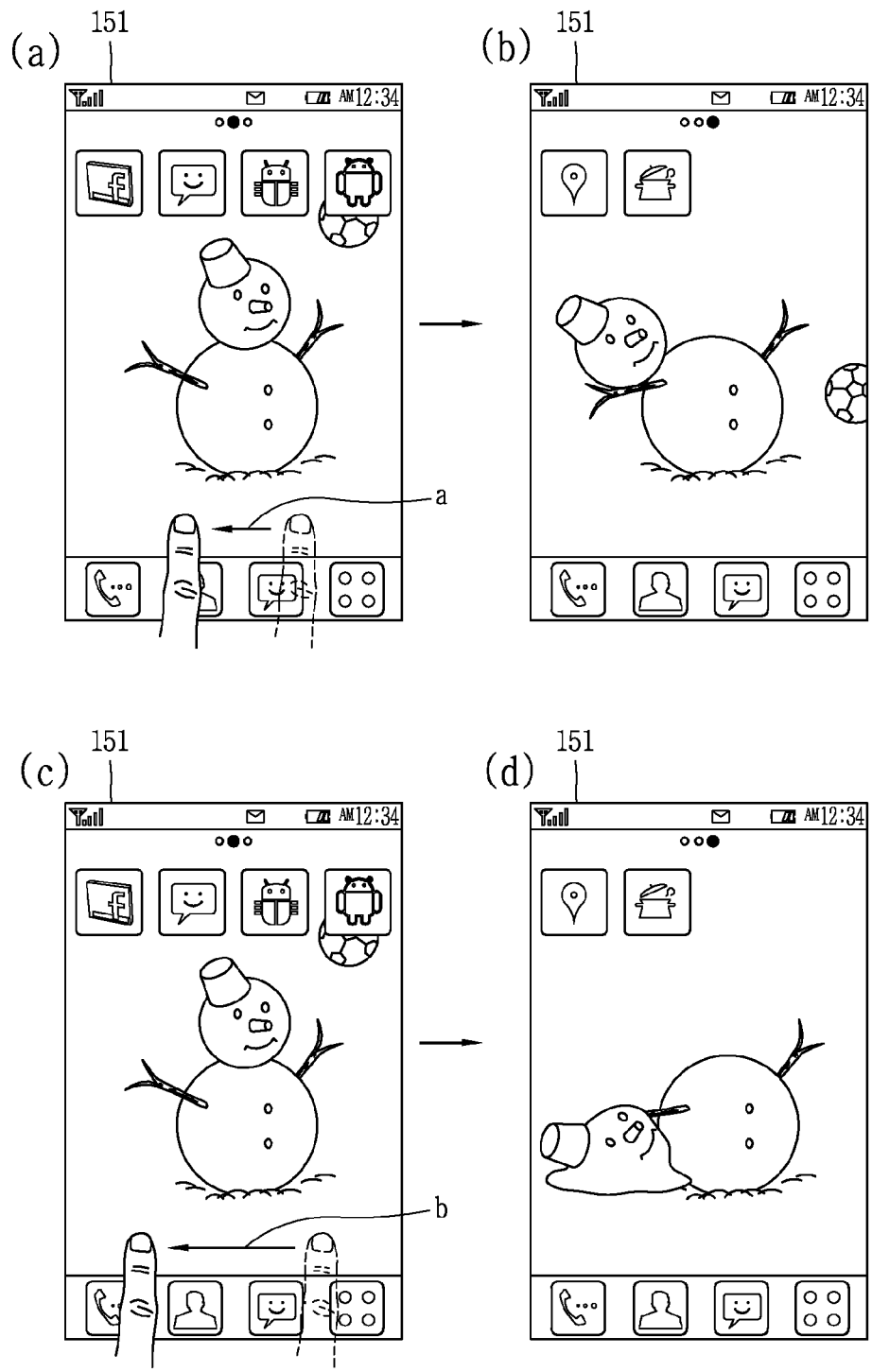

As illustrated in (a) of FIG. 5B, when a touch input corresponding to length 'a' is applied to the display unit 151, the controller 180 plays an image corresponding to the video data at a 'first rate' as illustrated in (b) of FIG. 5B. When a touch input corresponding to length 'b' shorter than the length 'a' is applied to the display unit 151 as illustrated in (c) of FIG. 5B, the controller 180 may play an image corresponding to the video data at a 'second rate' slower than the 'first rate' as illustrated in (d) of FIG. 5B.

Also, although not shown, the controller 180 may control differently a play rate of an image according to a touch rate of a touch input applied to the display unit 151.

In this manner, the mobile terminal may control a play rate of an image according to a touch length or a touch rate with respect to the display unit, thereby differentiating reactions according to various touch inputs. Thus, when the user applies a touch to the display unit, the mobile terminal reacts differently according to different touch inputs, obtaining visual fun.

In another example of a method for variously controlling an image played in a home screen page according to a touch input applied to the display unit 151 as sensed, the controller 180 may play video data even when there is no more home screen page to be moved.

Figure 5C:
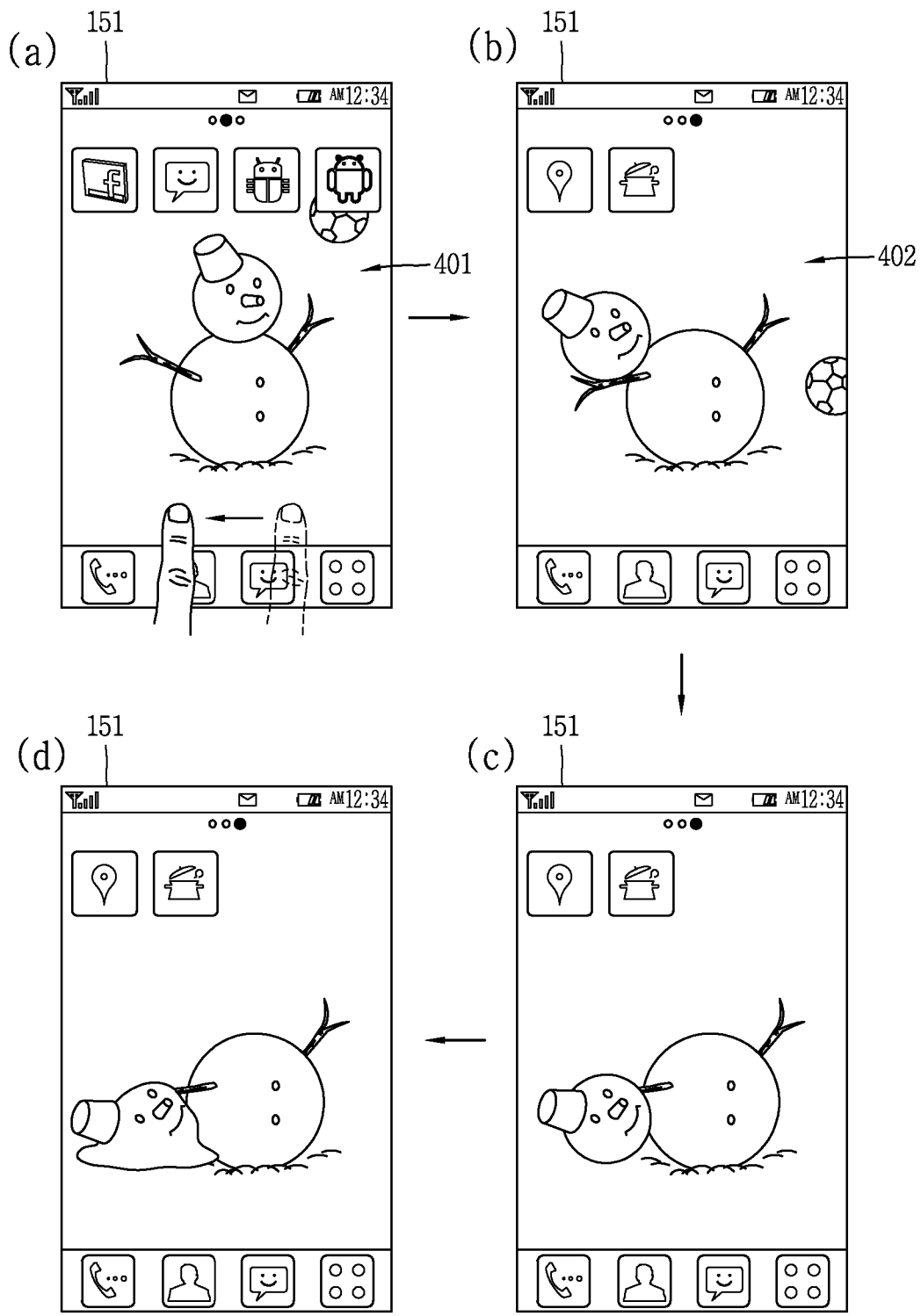

For example, as illustrated in (a) and (b) of FIG. 5C, when three home screen pages exist, switching from the second home screen page 401 to the third home screen page 402 is completed, so there is no more home screen page to be moved. However, in a case which there is a remaining quantity of video data to be played, the controller 180 may keep playing the remaining quantity of video data as illustrated in (c) and (d) of FIG. 5C.

Figure 5D:
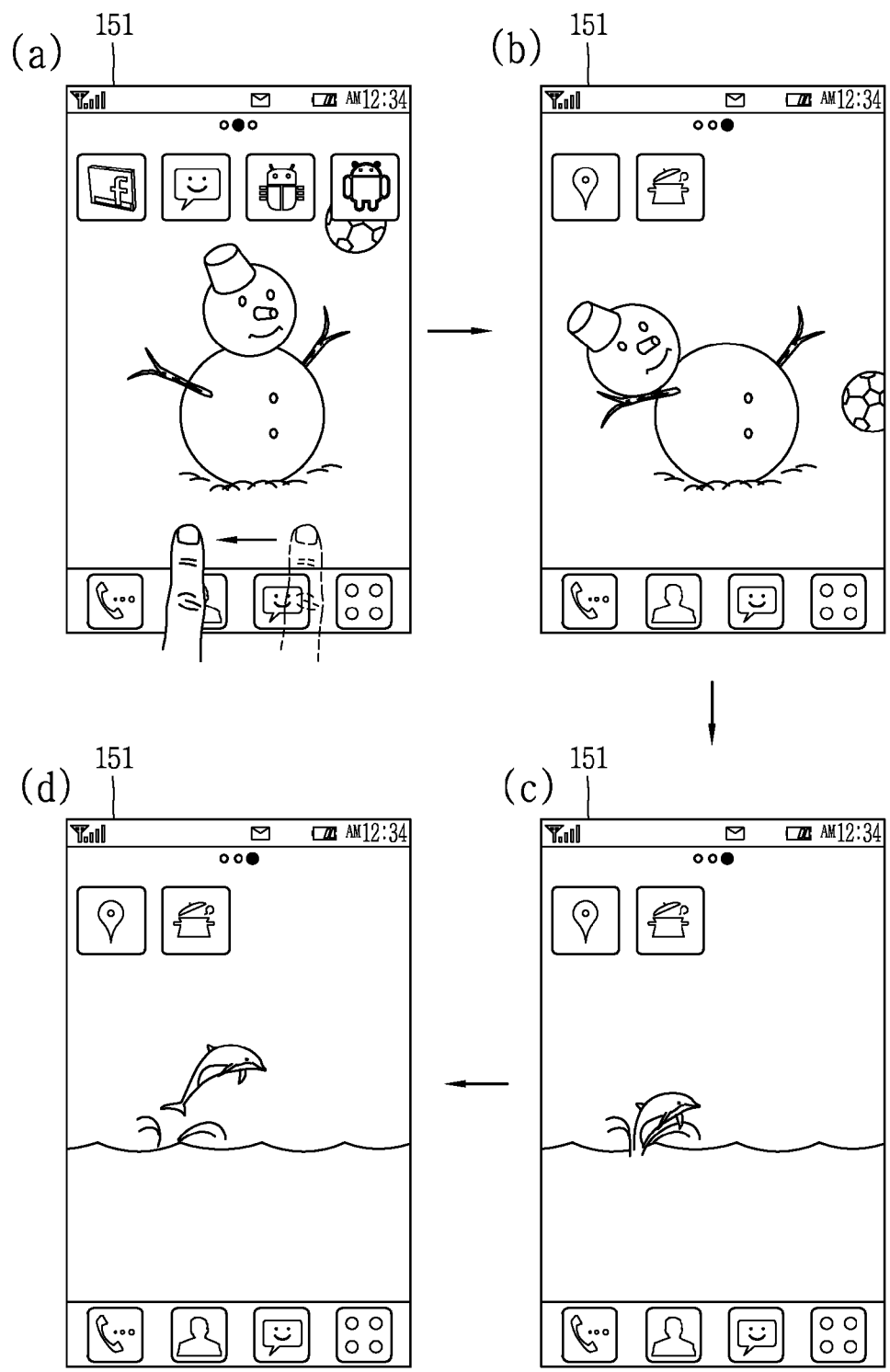

As illustrated in (c) and (d) of FIG. 5D, when playing of the remaining quantity of video data is completed, the controller 180 may continuously play video data different from the foregoing video data.

In another example of a method of variously controlling an image played in a home screen page according to a touch input applied to the display unit 151 as sensed, the controller 180 may output a progress bar 610 with respect to video data output in the home screen page.

Here, the progress bar 610 is formed by matching video data to time. The progress bar 610 is matched to a total play time of video data, and respective points of the progress bar 610 are matched to images included in video data. Namely, time information corresponding to each point of the progress bar 610 is matched to images having time information corresponding thereto.

Meanwhile, as illustrated in (b) and (c) of FIG. 6A, the progress bar 610 may be output to the display unit 151 while an image corresponding to the video data is being played on the home screen page, and when playing of the image corresponding to the video data is terminated, the progress bar 610 may disappear from the display unit 151.

Also, the user may change a play point in time of an image by adjusting the progress bar 610 through a touch input.

Also, as illustrated in (a), (b), (c), and (d) of FIG. 6A, the controller 180 may change an output position of an indicator 611 indicating to which spot a currently output image corresponds to a total play section of the video data in the progress bar 610.

In another example of a method for variously controlling an image played in a home screen page according to a touch input applied to the display unit 151 as sensed, the controller 180 may change an image output in a home screen page according to a direction of a touch input applied to a home screen page.

Namely, when a touch input is applied to the display unit 151 in a first direction, the controller 180 plays an image corresponding to video data, while switching from a first home screen page output to the display unit 151 to a second home screen page. When a touch input is applied to the display unit 151 in a second direction different from the first direction, the controller may switch the video data to video data different from the foregoing video data and change a background image of the first home screen page to an image corresponding to the different video data.

For example, as discussed above with reference to FIG. 5, the controller 180 switches a home screen page according to a touch input corresponding to a horizontal direction, and as illustrated in (a), (b), and (c) of FIG. 6B, the controller 180 may change video data set to be output to the home screen page to different video data in response to a touch input corresponding to a horizontal direction different from the horizontal direction. When the video data set to be output to the home screen page is changed to different video data, the controller 180 changes a background image of the home screen page to an image corresponding to the different video data as illustrated in (b) and (c) of FIG. 6B.

In this manner, the user may simply change the video data and the background image of the home screen page through a touch input in the home screen page.

As described above, in the mobile terminal according to an embodiment of the present invention, an image corresponding to video data output together with a home screen page can be variously controlled according to a touch input applied to the display unit.

Figure 7A:
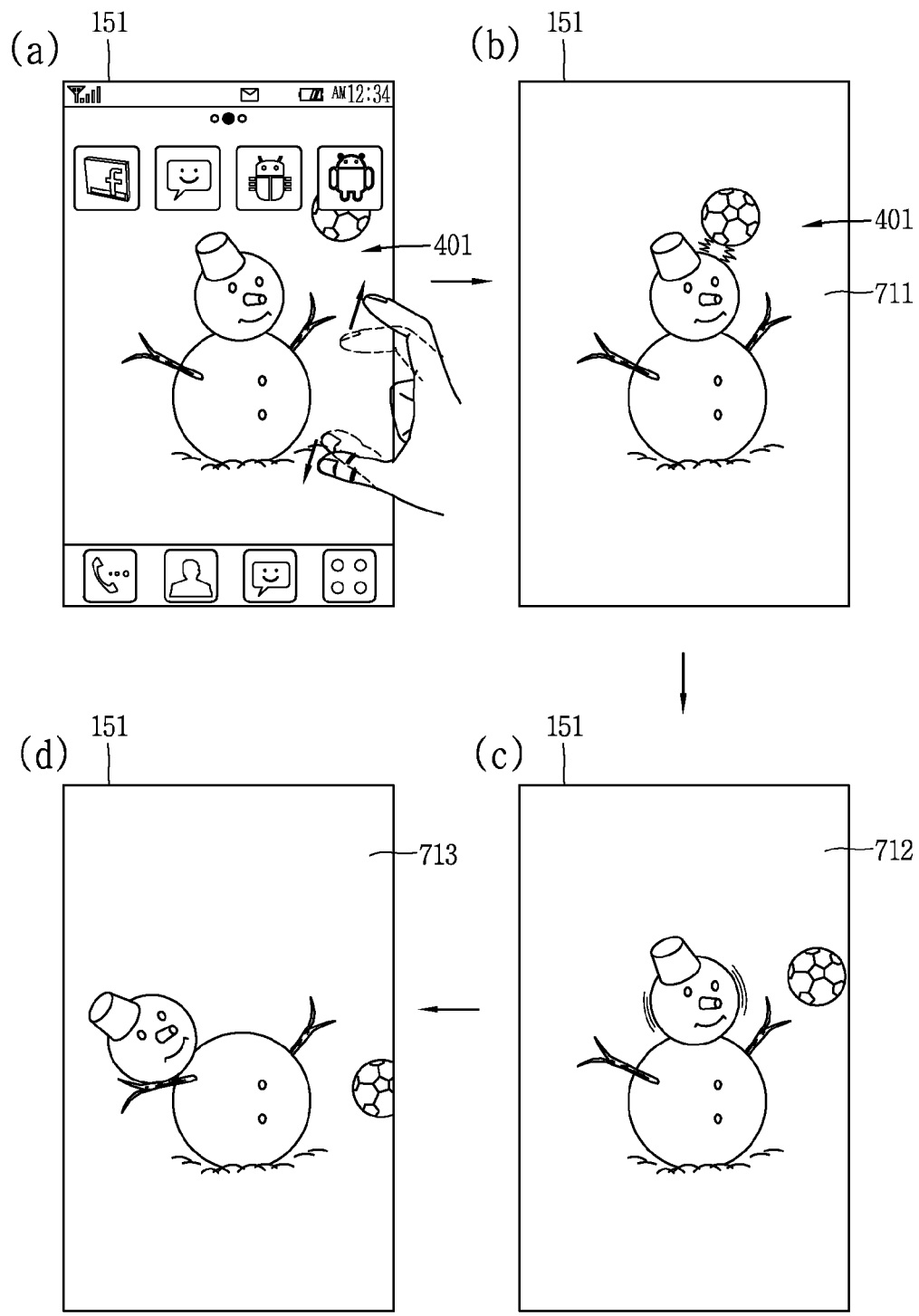
FIGS. 7A and 7B are conceptual views illustrating a method for providing a clean view mode in a mobile terminal according to an embodiment of the present invention.
Figure 7B:
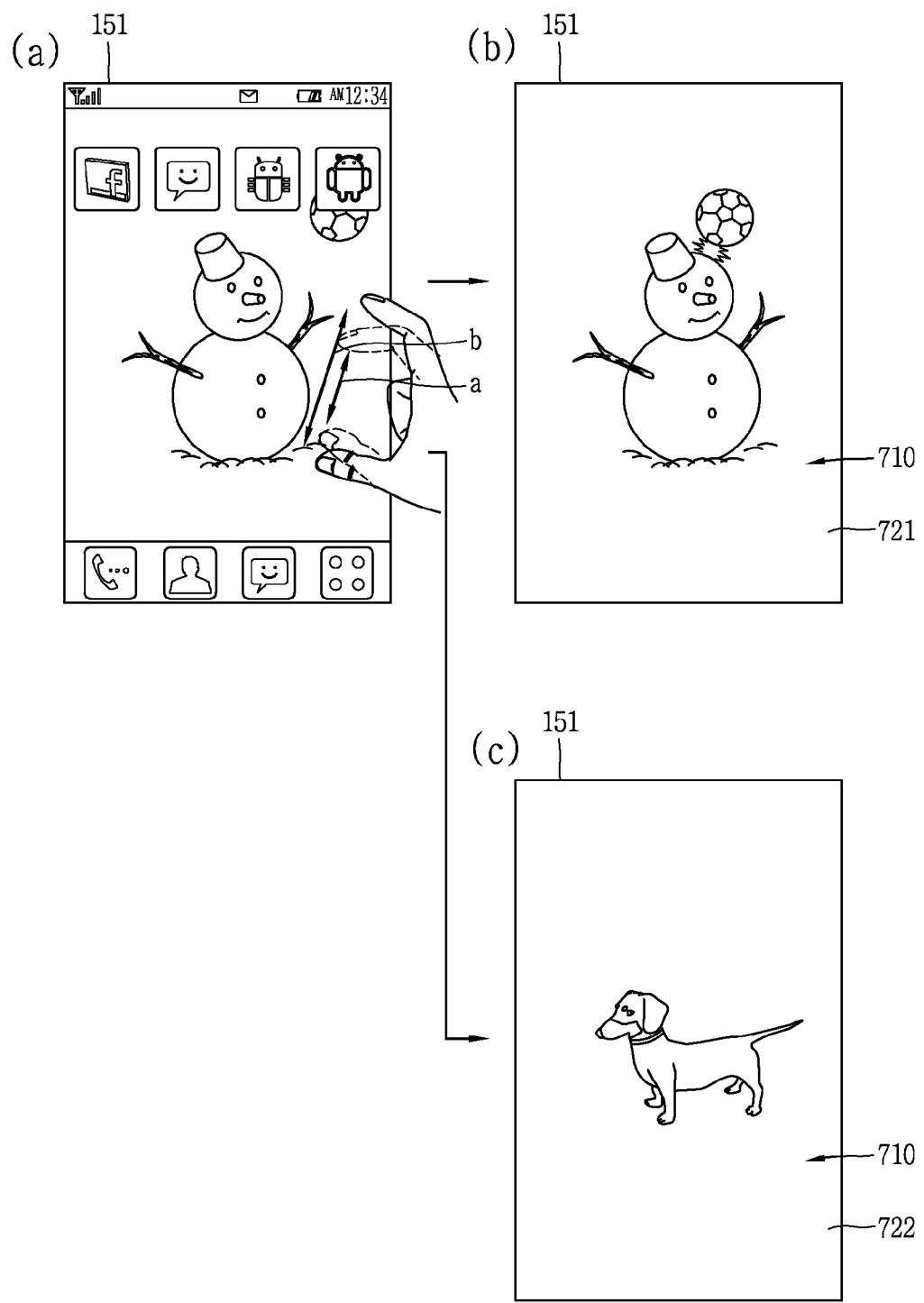
Figure 8A:
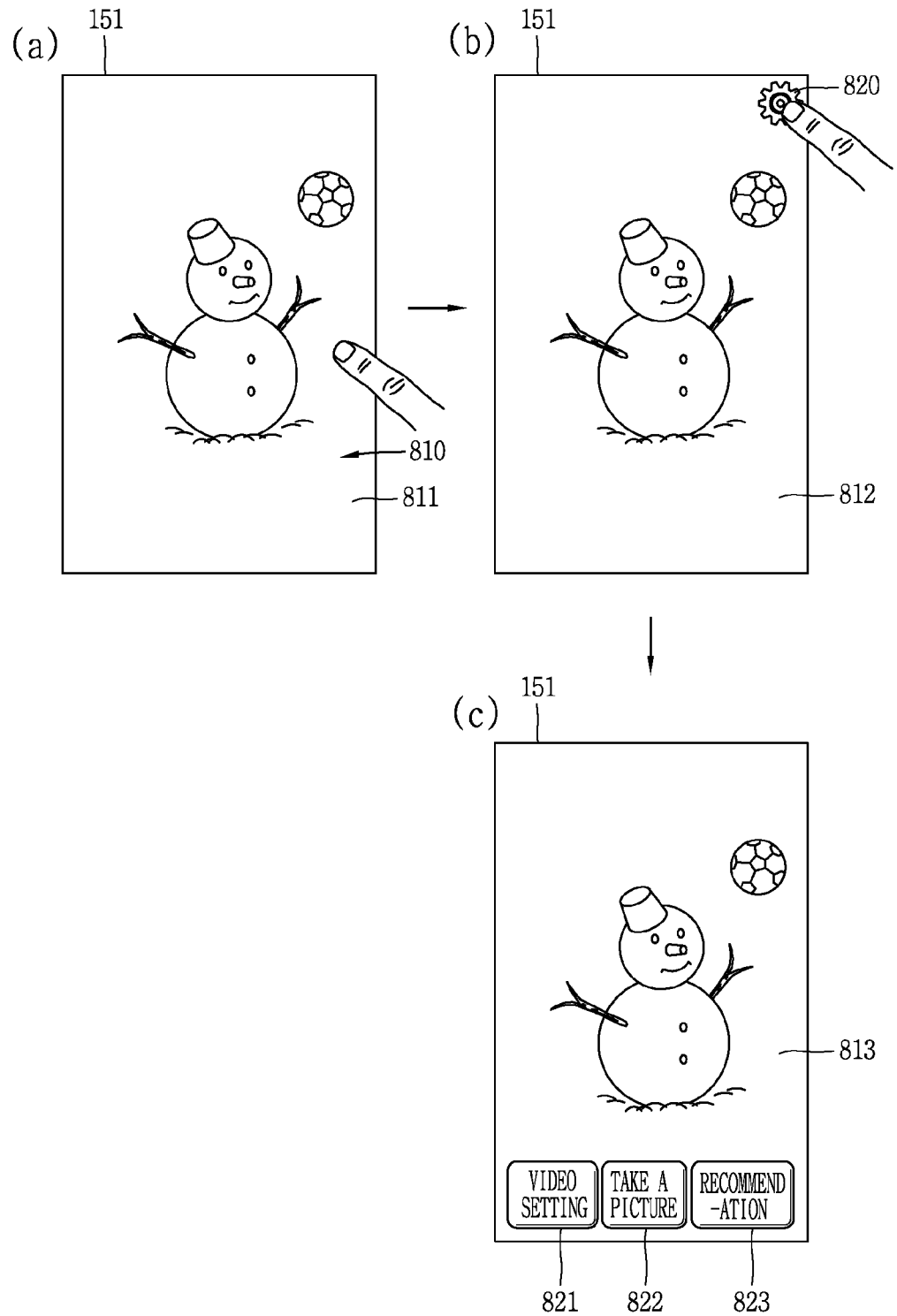
FIGS. 8A through 8C are conceptual views illustrating a method for controlling a video in the clean view mode of the mobile terminal according to an embodiment of the present invention.
Figure 8B:
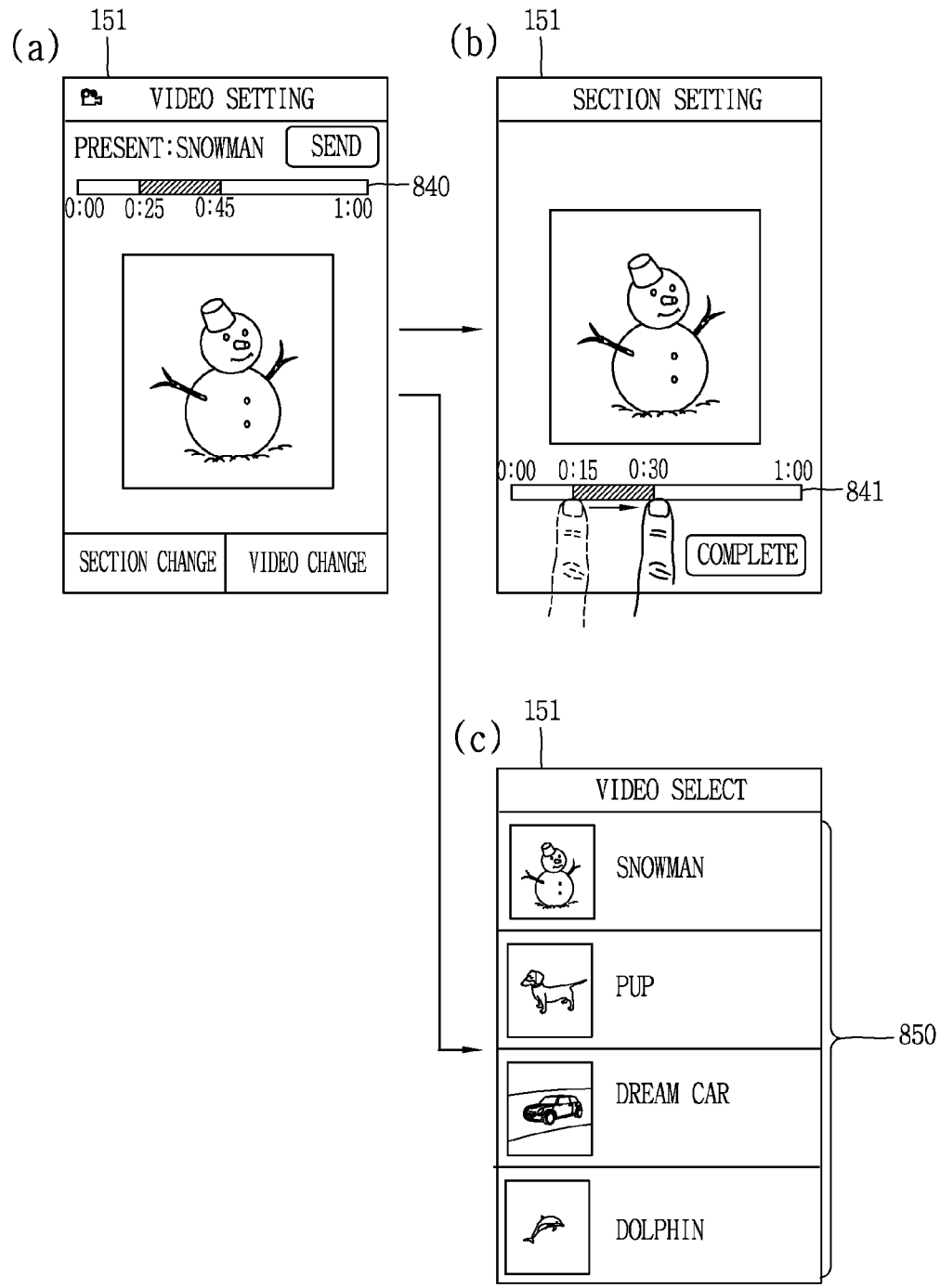
Figure 8C:
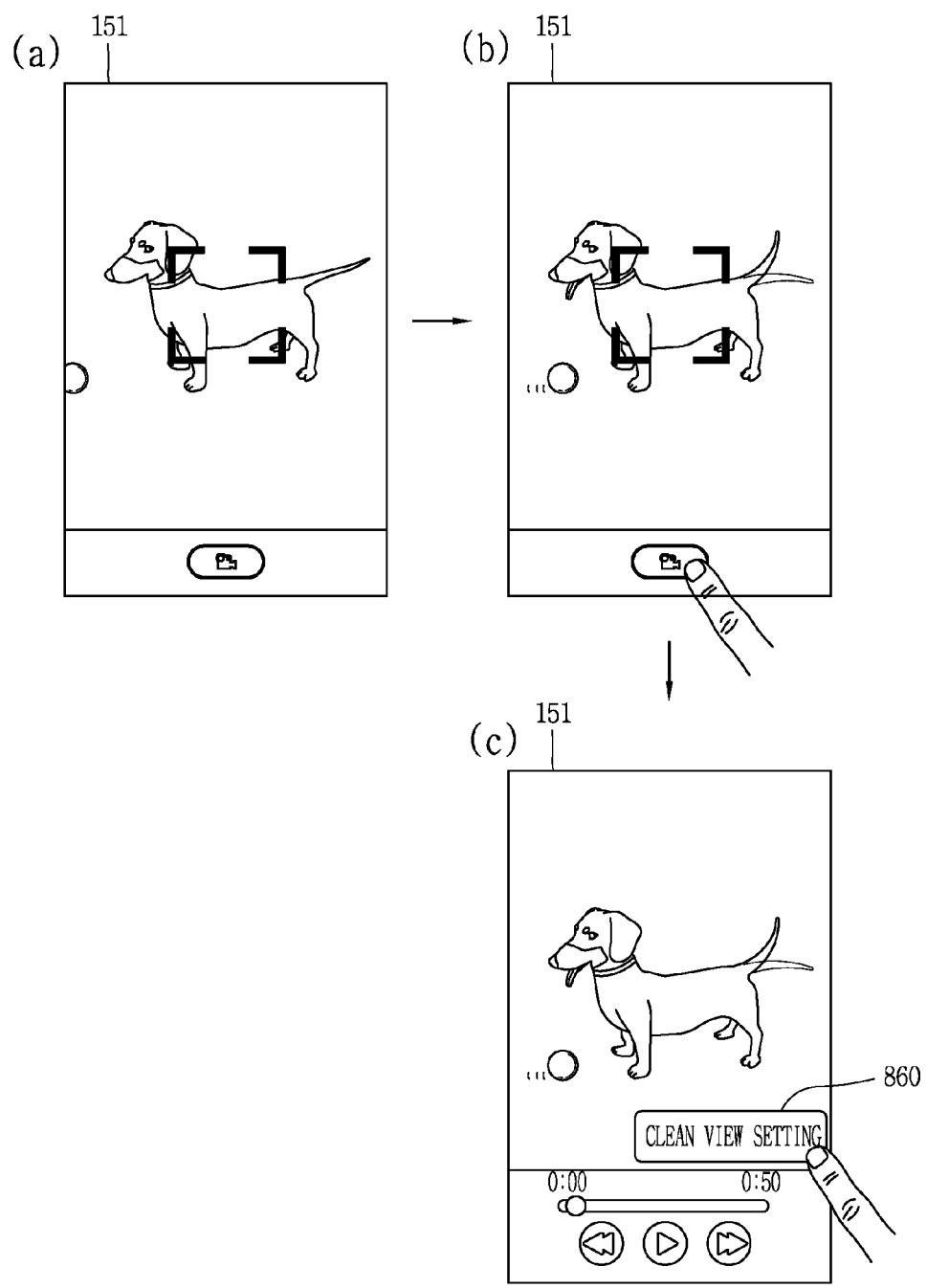

Hereinafter, a method for providing a clean view mode will be described in detail with reference to the accompanying drawings. FIGS. 7A and 7B are conceptual views illustrating a method for providing a clean view mode in a mobile terminal according to an embodiment of the present invention, and FIGS. 8A through 8C are conceptual views illustrating a method for controlling a video in the clean view mode of the mobile terminal according to an embodiment of the present invention.

In the mobile terminal according to an embodiment of the present invention, when anyone home screen page is switched to a different home screen page in response to a touch input applied to the display unit, a video may be played on the display unit 151. In addition to the playing an image when a home screen page is switched as described above, when an information display mode of the display unit 151 is a clean view mode, an image of video data may be played. Video data played in the clean view mode may be video data of an image played in a home screen page.

Here, the clean view mode may be in a state in which no information is displayed in the object 420 (please see FIG. 4) corresponding to an icon or a widget of an application installed in the mobile terminal, the identification information region 430 (please see FIG. 4), the state information region 440 (please see FIG. 4), and the pre-set region 450 (please see FIG. 4). In the clean view mode, only a background image of the home screen page 401 (please see FIG. 4) is output.

Meanwhile, when an output mode of the display unit 151 is the clean view mode, the controller 180 of the mobile terminal according to an embodiment of the present invention may play a video as illustrated in (b) of FIG. 7A. Meanwhile, an image played in the clean view mode may be an image related to video data associated with a background image of the home screen page 401 as illustrated in (a) of FIG. 7A.

Meanwhile, the clean view mode may be entered when a touch input corresponding to a pre-set scheme is applied to the display unit 151. For example, a touch input corresponding to the pre-set scheme may be a pinch-in touch input as illustrated in (a) of FIG. 7A. As illustrated, when a pinch-in touch input applied to the display unit 151 is sensed, the controller 180 may switch an output state of the display unit 151 into the clean view mode and play a video as illustrated in (b), (c), and (d) of FIG. 7A.

Meanwhile, when a touch input according to a pre-set scheme different from the touch input according to the pre-set scheme, e.g., a pinch-out type touch input, to the display unit 151, the controller 180 may terminate the clean view mode. When the clean view mode is terminated, a home screen page as illustrated in (a) of FIG. 7A may be output to the display unit 151. Meanwhile, a background image of the home screen page output as the clean view mode is terminated may be an image, which was output to the display unit 151 at the point in time at which the clean view mode was terminated.

Meanwhile, the controller 180 may play an image corresponding to different video data in the clean view mode according to a degree in which a pinch-in touch input for entering the clean view mode is applied. For example, when a pinch-in touch input having length 'a' as illustrated in (a) of FIG. 7B is applied, the controller 180 may play video of video data including an image output as a background image of the home screen page as illustrated in (b) of FIG. 7B.

When a pinch-in touch input having length 'b' as illustrated in (a) of FIG. 7B is applied, the controller 180 may play video corresponding to video data different from the video data including the image output as a background image of the home screen page as illustrated in (c) of FIG. 7B. Here, the different video data may be video data finally used in the display unit 151 or may be video data previously set by the user.

Also, although not shown, when a touch input applied to at least two spots is sensed in a state in which the home screen page is output as illustrated in (a) of FIG. 7A, the controller 180 may output information regarding video data that may be output according to the pinch-in touch input corresponding to the length 'a' and the length 'b'. As information regarding the video data, an image included in the video data may be output in a thumbnail form or a file name of the video data may be output.

Also, although not shown, a progress bar indicating a play time and a play state of the video data may be output in the clean view mode.

Meanwhile, according to an embodiment of the present invention, the mobile terminal in the clean view mode may immediately enter a mode for controlling or editing video data output in the clean view mode or video data output in the home screen page.

For example, when a touch input is applied to the display unit 151 while an image is being played in the clean view mode as illustrated in (a) of FIG. 8A, the controller 180 may output a graphic image 820 related to control and change of the video data as illustrated in (b) of FIG. 8A. When the graphic image 820 is output, the controller 180 may output specific control menus 821, 822, and 823 as illustrated in (c) of FIG. 8A. Also, the controller 180 may immediately output a control screen without the process of (c) of FIG. 8A.

For example, when a recommended menu 823 among control menus is selected, the controller 180 may output an icon corresponding to at least one application for downloading video data.

Also, when a video setting menu 821 among the control menus is selected, a video section to be played in the home screen page may be selected as illustrated in (a) and (b) of FIG. 8B, or video data to be played in the home screen page may be selected as illustrated in (a) and (c) of FIG. 8B.

Meanwhile, as illustrated in (c) of FIG. 8B, video data corresponding to items 850 output to the display unit may be video data edited to have a capacity level equal to or smaller than pre-set capacity so as to be used in the home screen or the clean view mode. Meanwhile, the video data edited to have a capacity level equal to or smaller than the pre-set capacity may be stored separately from the original video data in the memory 160 and may be transmitted to at least one external terminal according to a user selection.

Also, when an image capture menu 822 is selected from the control menus, the controller 180 activates the camera (not shown) and an input image signal may be captured through the camera as illustrated in (a) and (b) of FIG. 8C. When recording is terminated, the controller 180 may output an icon 860 for setting, so that the captured video data can be set as video output in the clean view mode as illustrated in (c) of FIG. 8C. In this manner, when the captured video data is selected as a video to be output in the clean view mode, the controller 180 may set any one of the images included in the captured video data as a background image of the home screen page.

As discussed above, in the case of the mobile terminal and the control method thereof according to embodiments of the present invention, video data can be immediately played in the clean view mode, without having to execute a separate video play application. Thus, the user may set preferred video data in advance such that the data is output in the clean view mode, whereby the user can easily use the data in a home screen page through a simple touch input.

Figure 9B:
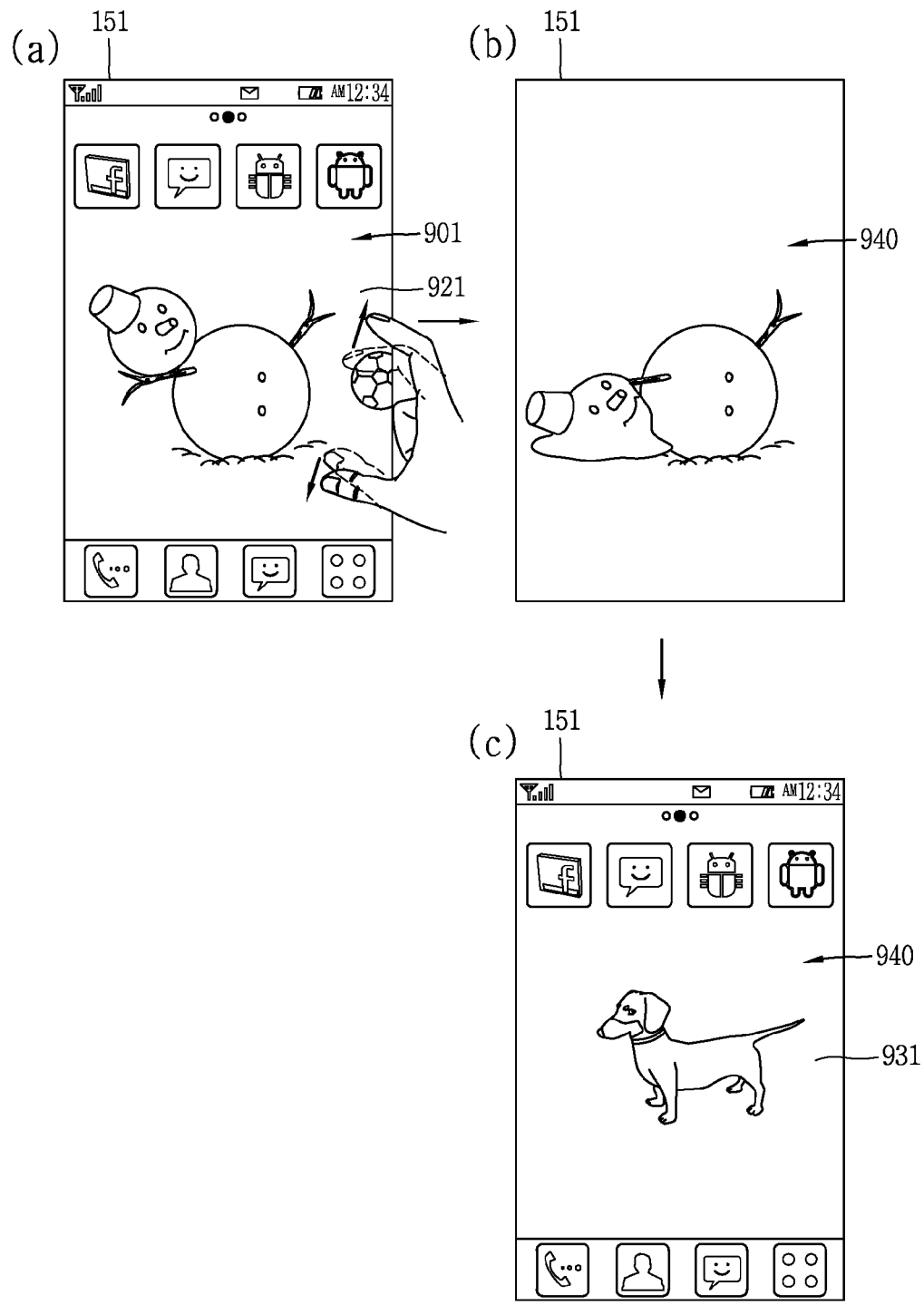

Hereinafter, a case in which an output request with respect to a home screen page is received while a video is being played in a mobile terminal will be described in detail with reference to the accompanying drawings. FIGS. 9A and 9B are conceptual views illustrating a method for outputting a video being used in a mobile terminal according to an embodiment of the present invention to a home screen page.

In the mobile terminal according to an embodiment of the present invention, when an output request with respect to a home screen page is received while images are being played in a video play application as illustrated in (a) of FIG. 9A, the controller 180 controls the display unit to continuously play or output the image played in the video play application, in the background of the home screen page, as illustrated in (b), (c), and (d) of FIG. 9A.

The controller 180 may play an image corresponding to video data output in the video play application, in the home screen page, or may output a still image corresponding to the video data as a background image of the home screen page.

While the images are continuously played in the home screen page, when the playing of images is terminated, the controller 180 may output again a background image, which was output in the home screen page, before the image corresponding to the video data is output to the home screen page.

Also, as illustrated in (a) of FIG. 9B, the controller 180 may output an image included in the video data played in the video play application, as a background image of a home screen page.

The background image output to the home screen page may be an image output to the display unit at a point in time at which an output request with respect to the home screen page is received.

In this manner, when a still image corresponding to the video data is output as a background image of the home screen, the controller 180 may play the image corresponding to the video data when the home screen page is changed as discussed above with reference to FIG. 4.

As illustrated in (a) and (b) of FIG. 9B, in response to a pre-set touch input (e.g., a pinch-in touch input), the controller 180 may activate the clean view mode 940 and continuously play the video, which has been played in the video play application, in the clean view mode.

When the playing of the video in the video play application is terminated, the controller 180 may terminate the clean view mode and output again the background image 931, which was output in the home screen page before the image corresponding to the video data was output to the home screen page, to the home screen page 940 as illustrated in (c) of FIG. 9B.

Also, although not shown, when the playing of the video in the video play application is terminated, the controller 180 may continuously play the video corresponding to the background image 931, which was output in the home screen page before the image corresponding to the video data was output to the home screen page, in the clean view mode.

Meanwhile, the output request with respect to the home screen page as mentioned above may be received according to a user selection or control in the mobile terminal.

Meanwhile, in the clean view mode as mentioned above, notification information regarding an event occurring in the mobile terminal may not be output or may be minimized to be output.

As described above, in the case of the mobile terminal and the control method thereof according to embodiments of the present invention, even when a home screen page is output while a video is being output, the user interface allowing the user to continuously use the output video is provided.

Also, in the case of the mobile terminal and the control method thereof according to embodiments of the present invention, while any one home screen page is being switched to another home screen page on the basis of a touch input applied to the display unit, a video is played on the display unit. Thus, since the user may be provided with the video, while the home screen page is being changed, the user may have visual fun in using a terminal.

Also, in the case of the mobile terminal and the control method thereof according to embodiments of the present invention, in a state in which a home screen page is output to a display unit, the clean view mode for playing a video, instead of the home screen page, is activated on the basis of a touch input applied to the display unit. Thus, the user can be provided with a video through a simple manipulation with respect to the display unit without having to access a separate menu to view a video.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a display outputting a first home screen page among at least one home screen page; and
a controller configured to:
control the display to output a first still image included in video data corresponding to a first point in time of the video data as a background image of the first home screen page;
receive a touch input, applied to the display displaying the first home screen page, for switching the first home screen page to a second home screen page different from the first home screen page;
control, in response to the received touch input, the display to move the first home screen page in a touch direction of the received touch input to switch the first home screen page to the second home screen page on the display;
control the display to play a video corresponding to the video data in response to moving the first home screen page based on the received touch input, wherein playing of the video corresponding to the video data is maintained while the first home screen page is moved, wherein the playing of the video is started from the first point in time, and wherein a play rate of the video is different according to a touch rate of the received touch input;
control the display to stop playing of the video corresponding to the video data when the switching from the first home screen page to the second home screen page is completed, wherein a play point in time, different from the first point in time, at which the playing of the video is stopped is different according to the touch rate of the received touch input; and
control the display to output the second home screen page having a background image in response to the completion of the switching from the first home screen page to the second home screen page,
wherein the background image of the second home screen page is set as a second still image included in the video data,
wherein the second still image, set as the background image of the second home screen page, is different according to the touch rate of the received touch input, wherein if the touch rate is a first touch rate, the background image of the second home screen page is a second still image corresponding to a second point in time of the video data, and wherein if the touch rate is a second rate different from the first touch rate, the background image of the second home screen page is a third still image corresponding to a third point in time of the video data.

2. The mobile terminal of claim 1, wherein the video data includes a plurality of still images including information regarding different points in time, and wherein the video played on the display is related to at least one image continued from the first image among the plurality of images.

3. The mobile terminal of claim 1, wherein at least one function icon corresponding to different functions is displayed in the home screen page, and wherein when a touch input corresponding to a pre-set scheme is applied to the display, the controller does not output the function icon any longer and activates a clean view mode for playing the video data on the display.

4. The mobile terminal of claim 3, wherein the touch input corresponding to the pre-set scheme is a pinch-in touch input, and wherein when a pinch-out touch input, the opposite to the pinch-in touch input, is applied to the display, the controller terminates the clean view mode and outputs again the function icon on the home screen page.

5. The mobile terminal of claim 4, wherein when the clean view mode is terminated, a third image, which was being displayed on the display at a point in time at which the pinch-out touch input was applied, is output as a background image of the home screen page.

6. The mobile terminal of claim 4, wherein the controller outputs still images corresponding to different video data according to a degree in which the pinch-in touch input is applied.

7. The mobile terminal of claim 3, wherein when the home screen page is output to the display, state information is output to a region of the display, and wherein in a state in which the clean view mode is activated, only the video data is played without outputting the state information.

8. The mobile terminal of claim 3, wherein when a touch input is applied to the display while the video is being played, the controller outputs at least one graphic image related to control and change of the video data.

9. The mobile terminal of claim 1, wherein the touch input is a flicking touch input or a dragging touch input, and wherein play sections of images played while the first home screen is being switched to the second home screen page according to the flicking touch input or the dragging touch input are different.

10. The mobile terminal of claim 1, wherein, when an output request with respect to a home screen page is received from a user while a still image corresponding to video data different from the video data is on the display, the controller plays the video corresponding to the different video data in a background of the home screen page together with the home screen page or outputs any one still image included in the different video data.

11. The mobile terminal of claim 1, wherein while the first home screen page is being switched to the second home screen page, the amount of still images included in the video data played on the display varies according to a user setting.

12. The mobile terminal of claim 1, wherein when a touch input is applied to the display in a first direction, the controller switches the first home screen page output to the display to the second home screen page, and wherein when a touch input is applied to the display in a second direction, the controller changes the video data to video data different from the video data, and changes a background image of the first home screen page to an image corresponding to the different video data.

13. The mobile terminal of claim 1, wherein the video data is video data edited to have a capacity level equal to or smaller than a pre-set capacity that was edited from video data having a capacity greater than the pre-set capacity, and wherein the video data is stored in a memory, together with the different video data edited to have a capacity level equal to or smaller than the pre-set capacity.

14. A control method of a mobile terminal, the method comprising:

outputting, n a display, a first home screen page having a first still image included in video data corresponding to a first point in time of the video data as a background image;

sensing a touch input, applied to the display displaying the first home screen page, for switching the first home screen page to a second home screen page different from the first home screen page with respect to the first home screen page;

controlling, in response to the received touch input, the display to move the first home screen page in a touch direction of the received touch input to switch the first home screen page to the second home screen page on the display;

controlling the display to play a video corresponding to the video data in response to moving the first home screen page based on the received touch input, wherein playing of the video corresponding to the video data is maintained while the first home screen page is moved, wherein the playing of the video is started from the first point in time, and wherein a play rate of the video is different according to a touch rate of the received touch;

stopping playing of the video corresponding to the video data when the switching from the first home screen page to the second home screen page is completed, wherein a play point in time, different from the first point in time, at which the playing of the video is stopped is different according to the touch rate of the received touch; and outputting, on the display, the second home screen page having a background image in response to the completion of the switching from the first home screen page to the second home screen page, wherein the background image of the second home screen page is set as a second still image included in the video data, wherein the second still image, set as the background image of the second home screen page, is different according to the touch rate of the received touch input, wherein if the touch rate is a first touch rate, the background image of the second home screen page is a second still image corresponding to a second point in time of the video data, and wherein if the touch rate is a second rate different from the first touch rate, the background image of the second home screen page is a third still image corresponding to a third point in time of the video data.

* * * * *